United States Patent Office 2,794,820
Patented June 4, 1957

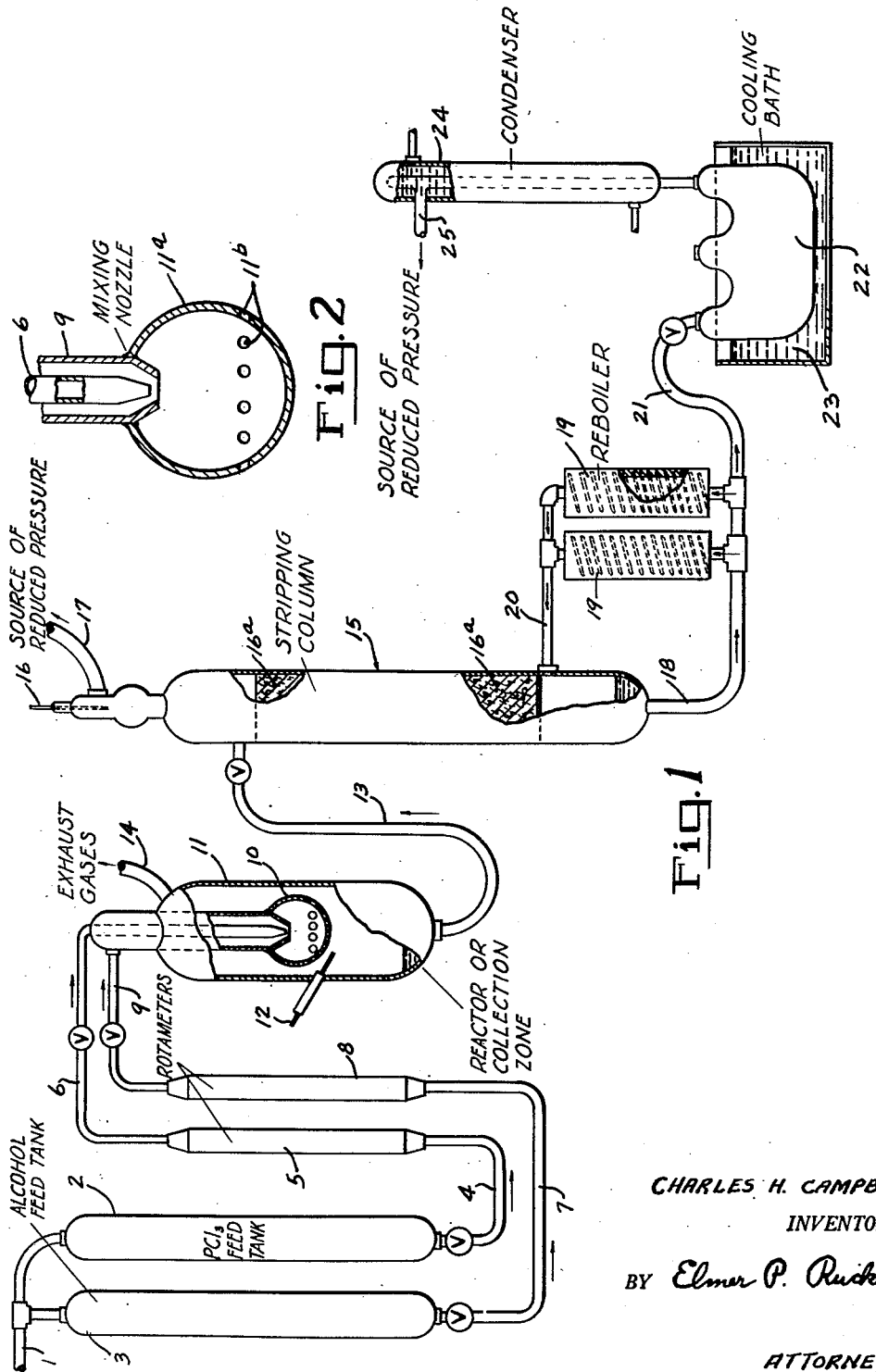

2,794,820

METHOD OF PRODUCING DIALKYL AND DICYCLOALKYL PHOSPHITES

Charles H. Campbell, Anniston, Ala., assignor to Monsanto Chemical Company, St. Louis, Mo., a corporation of Delaware Application September 24, 1952, Serial No. 311,300

10 Claims. (Cl. 260—461)

The present invention relates to di-hydrocarbon phosphites, specifically, dialkyl and dicycloalkyl phosphites and to a novel method of producing same.

An object of the invention is to provide an economically and commercially feasible method of producing dialkyl and dicycloalkyl phosphites.

Another object of the invention is to provide a continuous method of producing dialkyl and dicycloalkyl phosphites from phosphorus trihalides and the corresponding acyclic and alicyclic alcohols or mixtures thereof with water.

Another object of the invention is to provide a continuous method of preparing dialkyl and dicycloalkyl phosphites from phosphorus trihalides and the corresponding acyclic and alicyclic alcohols without the use of a solvent.

An additional object of the invention is to provide a continuous method of producing dialkyl and dicycloalkyl phosphites from phosphorus trihalides and the corresponding acyclic and alicyclic alcohols whereby a a simpler and more efficient control of the reaction heat is achieved as compared with the hitherto practiced methods of the prior art.

A further object of the invention is to provide a continuous method of producing dialkyl and dicycloalkyl phosphites from phosphorus trihalides and the corresponding acyclic and alicyclic alcohols, which is adapted for large volume production and involves relatively simple and less expensive equipment than the methods of the prior art.

A still further object of the invention is to provide a continuous method of producing dialkyl and dicycloalkyl phosphites from phosphorus trihalides and the corresponding acyclic and alicyclic alcohols, which results in substantially improved yields over the prior art batch methods of preparing the above products.

Other objects and advantages of the present invention will become apparent to those skilled in the art as the description proceeds.

Heretofore, dialkyl and dicycloalkyl phosphites have been produced by reacting phosphorus trihalides with the corresponding acyclic and alicyclic alcohols in a pot-type reactor in which the control of the reaction temperature is effected by indirect cooling with or without the aid of diluting solvents such as benzene. However, when the reactants are brought together en masse in this manner, it is difficult to obtain satisfactory mixing of the reactants, and to achieve uniform and efficient temperature control. Consequently, hot spots develop which result in localized decomposition and in a substantial reduction in the yield of the desired product. Moreover, this method involves a batch operation and therefore requires large and relatively expensive equipment for large volume production; in addition, it requires the use of agitators and stuffing boxes for the agitator shafts, all of which lead to mechanical and corrosion problems due to the leakage of hydrogen halides through the stuffing boxes and the corrosive action of these gases.

Dialkyl and dicycloalkyl phosphites have also been prepared in the absence of a solvent by slowly adding the trihalides to the corresponding acyclic and alicyclic alcohols. This method is subject to the disadvantage of proceeding at such a slow rate that it is economically and commercially unattractive.

More recently, dialkyl phosphites have been made by a continuous method in which a phosphorus trihalide is reacted, in the presence of a solvent, with an acyclic alcohol. In accordance with this method, the control of the reaction temperature is achieved by vaporizing the solvent which absorbs the heat of the reaction. However, this method is subject to the disadvantage of requiring the use of a solvent which for reasons of economy must be recovered and reused. This in turn requires additional operations and equipment, which substantially increase the cost of manufacturing these products and thus render this method economically and commercially unattractive.

In view of the foregoing, it is evident that until the instant invention was developed it was thought that the continuous manufacture of dialkyl or dicycloalkyl phosphites required the use of a solvent in order to achieve satisfactory control of the reaction temperature and/or to avoid the development of side reactions resulting in relatively low product yields. Moreover, while it was recognized that the reaction could be carried out in the absence of a solvent, it was thought that it had to be in a batch operation and, further, that it had to be carried out very slowly at low temperatures in order to avoid side reactions.

I have developed an economically and commercially feasible method of continuously producing di-hydrocarbon phosphites, specifically, dialkyl and dicycloalkyl phosphites, which avoids the disadvantages of the prior art methods previously described.

In accordance with this method, acyclic and alicyclic alcohols are reacted with phosphorus trihalides in the absence of a solvent and in a continuous manner, the reaction proceeding in the manner indicated by the following equation:

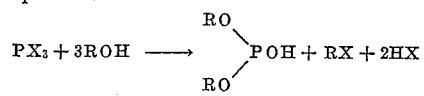

wherein R is selected from the group consisting of acyclic alicyclic radicals, and X is a halogen atom, preferably chlorine or bromine. In carrying out this reaction, the reactants are continuously supplied in separate streams to a reaction zone where they are intimately mixed and allowed to react without substantially restraining the rise in temperature due to the exothermic heat of reaction. This reaction yields a crude liquid product containing dialkyl or dicycloalkyl phosphites and a gaseous by-product comprising a hydrogen halide, an organic halide and unreacted materials. These products are continuously discharged from the reaction zone into a collection zone. The majority of the gaseous by-product is rapidly separated by vaporization from the crude liquid product and then discharged from the system. The crude liquid reaction product is continuously withdrawn from the collection zone into a stripping column operating under reduced pressure to further separate low boiling impurities which include dissolved hydrogen halide, organic halide and unreacted material. These low boiling impurities are continuously exhausted from the stripping column and then conveyed, if desired, to a suitable recovery system, while the relatively pure liquid product consisting essentially of the desired dialkyl or dicycloalkyl phosphite is continuously removed from the stripping column and conveyed to a suitable receiver. The dialkyl or dicycloalkyl phosphite obtained in this manner is a substantially pure product, but if further purity is desired, it may be purified by batch or continuous distillation.

In the practice of the instant invention, it is possible to employ not only anhydrous alcohol but also alcohol-water mixtures, with or without dispersing agents, provided the water content of such mixtures is not substantially in excess of one mole of water per mole of phosphorus trihalide employed in the reaction. The use of alcohol-water mixtures in the process results in the formation of a greater proportion of hydrogen halide and a smaller proportion of organic halide. Thus, theoretically, when employing one mole of water and two moles of alcohol per mole of phosphorus trihalide, the reaction should result in the formation of three moles of hydrogen halide and no, or very little, organic halide. This reaction may be written as follows:

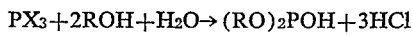

$$PX_3 + 2ROH + H_2O \rightarrow (RO)_2POH + 3HCl$$

from which it is evident that theoretically 0.5 mole of dialkyl- or dicycloalkyl-phosphite is produced per mole of alcohol.

For a more complete understanding of the instant invention, reference is made to the accompanying drawings, it being understood that modifications and variations in the equipment apparent to those skilled in the art may be made as desired without departing from the scope of the invention.

Figure 1 is a side elevational view, partially in section, of laboratory apparatus successfully used in practicing the present invention.

Figure 2 is an enlarged vertical sectional view of the mixing nozzle used in Figure 1.

Referring to Figure 1, reference character 1 represents a line for introducing nitrogen or another inert gas under pressure into graduated feed tanks 2 and 3 containing a phosphorus trihalide and an acyclic or alicyclic alcohol or mixtures thereof with water, respectively. When applied, the nitrogen pressure forces the phosphorus trihalide by way of valve-controlled line 4, rotameter 5 and valve-controlled line 6; and the alcohol via valve-controlled line 7, rotameter 8 and valve-controlled line 9 into the mixing nozzle 10 where they are intimately mixed and reacted together to produce a crude liquid product containing a dialkyl or dicycloalkyl phosphite and a gaseous product including hydrogen halide, an organic halide and unreacted materials. The crude liquid and gaseous products flow continuously into the collector 11 which is provided with a thermometer 12 for measuring the reaction temperature, a valve-controlled cooled discharge line 13 for the liquid product and a vent line 14 for exhausting the gaseous product from the system. In the manufacture of low boiling dialkyl- or dicycloalkyl-phosphite, the collector 11 is preferably strongly cooled by an alcohol-Dry Ice bath or another equivalent cooling means (not shown) in order to quench the decomposition reaction and thereby obviate a substantial reduction in yield of these products. The collector 11 serves primarily as a collection chamber since the phosphorus trihalide-alcohol reaction is substantially completed in the mixing nozzle 10.

The majority of the liquid and gaseous reaction products produced in the mixing nozzle 10 are continuously separated in the collector 11, the separated liquid product being conveyed continuously by valve-controlled line 13 into the top of a packed stripping column 15 and the gaseous product being continuously exhausted from the collector 11 by way of line 14.

The stripping column 15 is equipped with a thermometer 16 for measuring the temperature of the exhaust gases; packing 16a such as Berl saddles; an exhaust line 17 connected to a source of reduced pressure and, if desired, a by-product recovery system (not shown); and a crude liquid product discharge line 18. This discharge line is connected to an electrically heated reboiler 19 which is provided with a thermometer (not shown) for measuring the reboiler temperature. This reboiler communicates with the bottom of the stripping column 15 by means of line 20 and thus provides for the continuous recycling of the crude liquid product to the stripper for further purification.

In the stripping column, the residual low boiling impurities, including hydrogen halide, organic halide and unreacted materials are removed from the crude liquid product by means of heat derived from the reboiler.

The relatively pure liquid product flows continuously from the reboiler by valve-controlled line 21 into a receiver 22 which is immersed in a cooling bath 23. To further minimize loss of product by vaporization, the receiver is equipped with a water-cooled condenser 24 which in turn is connected to a source of reduced pressure by line 25. This reduced pressure is employed to withdraw the liquid product from the reboiler into the receiver 22 when line 21 is open.

The relatively pure dialkyl- or dicycloalkyl-phosphite continuously collected in receiver 22 may be further purified if desired by distillation or in any other conventional manner. However, this may not be necessary since the product is generally of sufficient purity for most purposes.

Referring to Figure 2, it will be noted that the mixing nozzle is formed by enlarging the end of the valve-controlled line 9 which extends into the collector 11, and then inserting the corresponding end of the valve-controlled line 6 into the line 9 so that they are concentrically arranged with respect to each other and terminate in substantially the manner illustrated in the drawing. In addition, it will be observed that there is also provided an element 11a secured in any suitable manner to the enlarged portion of line 9, the element 11a being equipped with perforations 11b which permit the reaction products to flow from the mixing nozzle in the collector or collection zone 11.

In the practice of the invention in this apparatus, the reactants are continuously supplied to the mixing nozzle 10 where they are intimately mixed and reacted together to form dialkyl- or dicycloalkyl-phosphites. The reactants are fed to the mixing nozzle at rates providing substantially three moles of alcohol or two moles of alcohol and one mole of water per mole of phosphorus trihalide. During this operation, the reaction temperature is permitted to seek its own level which generally falls substantially in the range of about 30° C. to about 100° C. However, if desired, it is within the scope of the invention to precool or preheat the reactants, but this is obviously undesirable since it adds an unnecessary item of expense to the manufacture of these products.

The crude liquid reaction product is continuously conveyed from the mixing nozzle into the collector and the by-product gas and entrained vapors are continuously discharged from the system in the previously described manner.

In the production of relatively low boiling dialkyl or dicycloalkyl phosphites, the collector is preferably cooled so as to minimize the decomposition of these products after their formation. This also has the advantage of reducing the load on the stripper and minimizing loss of these products in the stripping operation.

The crude liquid reaction product is continuously withdrawn from the collector into the stripping column which is preferably operated under reduced pressure. In the stripping column, the residual low boiling impurities are separated from the crude liquid reaction product by means of heat derived from the reboiler. The purified product is continuously conveyed to a suitable receiver and used as such, but if greater purity is desired, it may be subjected to batch or continuous distillation.

The following examples will serve to illustrate results obtainable by the method of the instant invention, but they are not to be construed as in any way limiting the broad scope of the invention.

EXAMPLE I

*Preparation of dimethyl phosphite*

The feed tanks of the described apparatus were charged with methyl alcohol and phosphorous trichloride and the collector or collection zone was cooled to about −20° C. by means of an alcohol-Dry Ice bath.

The reactants were charged continuously for a period of 1½ hours into the mixing nozzle at rates adjusted so that the weight ratio of alcohol to phosphorous trichloride was approximately 0.98. During this run, the reaction took place at a temperature within the range of about 65° C. to about 75° C. The resulting crude liquid reaction product was withdrawn from the mixing nozzle into the collection zone and from there was conducted continuously into the stripper which operated under a reduced pressure of about 40 to about 45 millimeters of mercury. During the stripping operation, the reboiler was heated to a temperature of about 83° C. to about 92° C. and the stripper head temperature was held at about 27° C. to about 28° C. The relatively pure liquid residue obtained in this manner was continuously withdrawn from the reboiler and at the end of the run distilled under reduced pressure to separate dimethyl phosphite in a substantially pure condition. This product was recovered in a yield amounting to 86.2% of theory, basis $PCl_3$.

EXAMPLE II

*Preparation of diethyl phosphite*

The procedure followed in Example I was repeated using ethyl alcohol and phosphorous trichloride in an alcohol to phosphorous trichloride weight ratio of approximately 1.31. During the course of the run, the reaction proceeded at a temperature wthin the range of about 74° C. to about 79° C. The resulting crude liquid reaction products were withdrawn from the collector and fed into the top of the stripper which operated under a reduced pressure of about 10 to about 18 millimeters of mercury. During the stripping operation, the reboiler was heated to a temperature of about 83° C. and the stripper head temperature was maintained at about 23° C. to about 24° C. The relatively pure liquid residue obtained in this manner was continuously withdrawn from the reboiler and at the end of the run distilled at a temperature of about 47° C. to 48° C. and at a pressure of 2 millimeters of Hg to recover diethyl phosphite in a yield corresponding to 95% of theory, basis $PCl_3$.

EXAMPLE III

*Preparation of diisopropyl phosphite*

The procedure employed in Example I was repeated using isopropyl alcohol and phosphorous trichloride in a weight ratio of alcohol to trichloride of about 1.33. The reaction was executed at a temperature in the range of about 76° C. to about 79° C. The resulting crude liquid reaction product was withdrawn, as it was formed, from the mixing nozzle and continuously discharged into the collection zone. From the collection zone, it was conveyed continuously into the stripper which operated under a reduced pressure of about 11 to about 14 millimeters of mercury. During the stripping step, the reboiler was heated to a temperature of about 74° C. to about 86° C. and the stripper head temperature was about 19° C. to about 22° C. The relatively pure liquid residue from the stripping operation was continuously discharged from the reboiler and at the end of the run subjected to distillation under reduced pressure to separate diisopropyl phosphite in a substantially pure form. This ester was recovered in a yield amounting to 96% of theory, basis $PCl_3$.

EXAMPLE IV

*Preparation of di-n-butyl phosphite*

The procedure followed in Example I was repeated employing n-butyl alcohol and phosphorus trichloride in a weight ratio of alcohol to phosphorus trichloride of about 1.82. The ensuing reaction occurred at a temperature in the range of about 82° C. to about 87° C. The resulting crude liquid reaction product was withdrawn, as rapidly as it was formed, from the mixing nozzle into the collection zone. From this zone, it was conducted continuously into the stripper which operated under a reduced pressure of about 12 to about 16 millimeters of mercury. During the stripping operation, the reboiler was heated to a temperature of about 108° C. to about 113° C. and the stripper head temperature was maintained at about 19° C. to about 25° C. The relatively pure liquid residue from the stripper was discharged continuously from the reboiler and at the end of the run distilled under diminished pressure to yield substantially pure di-n-butyl phosphite in an amount corresponding to 95.4% of theory, basis $PCl_3$.

EXAMPLE V

*Preparation of dihexyl phosphite*

The procedure described in Example I was followed using normal hexyl alcohol and phosphorous trichloride in a weight ratio of alcohol to trichloride of approximately 2.86. The ensuing reaction took place at a temperature within the range of about 90° C. to about 93° C. and the crude liquid reaction product thus obtained was withdrawn into the top of the stripper which operated under a vacuum of about 10 to about 13 millimeters of mercury. The reboiler was heated to a temperature in the range of about 92° C. to about 165° C. while the stripper head temperatures ranged within the limits of about 28° C. to about 47° C. The resulting relatively pure liquid residue was continuously withdrawn from the reboiler and at the end of the run distilled at a temperature of about 143° C. to about 146° C. and at a pressure of about 2 millimeters of mercury to recover dihexyl phosphite in a yield amounting to 98.5% of theory, basis $PCl_3$.

EXAMPLE VI

*Preparation of dioctyl phosphite*

The procedure described in Example I was repeated using normal octyl alcohol and phosphorous trichloride in a weight ratio of alcohol to trichloride of approximately 2.81. During this run, the alcohol bath around the collector was not cooled and the reaction temperature ranged between about 90° C. to about 99° C. The resulting crude liquid reaction product was conducted into the top of the stripper which operated under a reduced pressure of about 6 to about 7 mm. of mercury. During the stripping operation, the reboiler temperature ranged between about 117° C. and about 167° C. and the stripper head temperature varied between about 17° C. at the start to about 55° C. at equilibrium. The relatively pure liquid residue was continuously drawn from the reboiler and distilled at 173° C. to 175° C. at 1 mm. Hg to recover diocetyl phosphite in a yield of about 90.5% of theory, basis $PCl_3$.

EXAMPLE VII

*Preparation of di-2-ethylhexyl phosphite*

The procedure described in Example VI was followed using 2-ethylhexyl alcohol and phosphorus trichloride in a weight ratio of alcohol to trichloride of approximately 2.8. The resulting reaction was carried out at a temperature which varied within the limits of about 98° C. to about 107° C. The crude liquid reaction product thus formed was withdrawn into the top of the stripper which operated under a vacuum of about 6 mm. to about 7 mm. of mercury. During the stripping operation, the reboiler was heated to a temperature within the range of about 119° C. to about 145° C. and the temperature in the stripper head varied within the limits of about 19° C. to about 41° C. The relatively pure liquid residue recovered from the stripper was continuously removed from the reboiler and at the end of the run distilled at 165° C. to about 166° C. and at 2 mm. Hg to separate di-2-ethylhexyl phosphite in a yield amounting to 85% of theory, basis PCl₃.

EXAMPLE VIII

*Preparation of di-2-butyloctyl phosphite*

The procedure described in the preceding example was followed employing 2-butyloctyl alcohol and PCl₃ and the following operating conditions:

Di - 2 - butyloctyl alcohol/PCl₃ weight ratio____ 4.1.
Reaction temperature_____ About 80° C. to about 94° C.
Pressure in stripper_____ About 6 to about 23 mm. Hg.
Reboiler temperature_____ About 114 to about 220° C.
Stripper head temperature_ About 62 to about 101° C.

The relatively pure liquid product recovered from the stripper was continuously withdrawn from the reboiler and at the end of the run distilled at about 215° C. to about 220° C. and at 1 mm. Hg to recover di-2-butyloctyl phosphite in a yield corresponding to 82% of theory, basis PCl₃.

EXAMPLE IX

*Preparation of dicyclohexyl phosphite*

The procedure of the preceding example was followed employing cyclohexyl alcohol and phosphorus trichloride and the following operating conditions:

Cyclohexyl alcohol/
 PCl₃ weight ratio___ About 2.4.
Reaction temperature___ About 77° C. to about 83° C.
Pressure in stripper___ About 7 mm. to about 8 mm. Hg.
Reboiler temperature_ About 74° C. to about 172° C.
Stripper head temperature _____ About 22° C. to about 39° C.

The relatively pure liquid residue from the stripper was continuously drawn from the reboiler and at the end of the run heated under a vacuum to remove low boiling by-products and unreacted cyclohexyl alcohol. The yield of crude product was approximately 70% of theory, basis PCl₃.

EXAMPLE X

*Preparation of di-1-methylbutyl phosphite*

The procedure used in this example was similar to that of the preceding example except that 1-methylbutyl alcohol and PCl₃ and the following operating conditions were employed:

1-methylbutyl alcohol/
 PCl₃ weight ratio__ About 1.9.
Reaction temperature_ About 82° C. to about 93° C.
Pressure in stripper__ About 7 mm. to about 8 mm. Hg.
Reboiler temperature_ About 83° C. to about 118° C.
Stripper head temperature _____ About 23° C. to about 24° C.

The relatively pure liquid residue from the stripper was continuously removed from the reboiler and at the end of the run distilled at 91° C. to about 93° C. and at 1 mm. Hg to recover di-1-methylbutyl phosphite in a yield corresponding to about 64% of theory, basis PCl₃.

EXAMPLE XI

*Production of di-tridecyl phosphite using a water-tridecyl alcohol emulsion*

The procedure employed in Example VI was followed using feed rates adjusted to supply approximately 3.41 moles of a mixture of branched-chain primary C₁₃-aliphatic alcohols, about 0.68 mole of water dispersed in these alcohols and about 1.46 moles of PCl₃. During this run, the reaction took place at a temperature of about 78° C. The crude liquid reaction product was conducted into the top of the stripper which operated under a reduced pressure of about 33 to about 34 mm. of mercury. During the stripping operation, the reboiler temperature ranged within the limits of about 175° C to about 197° C. and the stripper head temperature varied between the limits of about 34° C. to about 37° C. The relatively pure liquid residue was continuously withdrawn from the reboiler and distilled under the reduced pressure to recover di-tridecyl phosphite. This product was recovered in a yield of about 67.6% of theory, basis PCl₃. Stated differently, the moles of product recovered per mole of tridecyl alcohol used was equal to 0.290.

EXAMPLE XII

*Production of di-tridecyl phosphite using anhydrous tridecyl alcohol*

The procedure employed in Example VI was followed using feed rates adjusted to supply about 3.35 moles of a mixture of anhydrous branched-chain primary C₁₃-aliphatic alcohols and about 1.13 moles of phosphorus trichloride. During this run, the reaction took place in a temperature range of about 68° C. to about 82° C. The crude liquid reaction product was conveyed into the top of the stripper which was operated under a reduced pressure of about 7 to about 8 mm. of mercury. During the stripping operation, the reboiler temperature varied within the limits of about 117° C. to about 200° C. and the stripper head temperature ranged within the limits of about 23° C. to about 83° C. The relatively pure liquid residue was continuously withdrawn from the reboiler and distilled under reduced pressure to recover di-tridecyl phosphite. This product was obtained in a yield of about 67% of theory, basis PCl₃. Stated in a different manner, the moles of product produced per mole of tridecyl alcohol used was equal to 0.227.

In the practice of the instant invention, continuously flowing streams of phosphorus trihalide and an alcohol or mixture thereof with water are brought together and mixed in a reaction zone in an alcohol to phosphorus trihalide molar ratio of substantially 3 to 1 or in a molar ratio of 2 moles of alcohol and 1 mole of water to 1 mole of trihalide. The resulting mixture is allowed to react without substantially restraining the rise in temperature due to chemical reaction and the reaction products are promptly removed from the reaction zone into a collection zone as rapidly as they are formed. In the collection zone, most of the gaseous by-products, namely, hydrogen halide, organic halide and unreacted materials, are rapidly separated by vaporization from the crude liquid product and in this operation, the latter is cooled below the temperature at which the dialkyl or dicycloalkyl phosphite is substantially decomposed by the dissolved hydrogen halide. This cooling step is apparently of little significance in the case of the relatively high boiling dialkyl phosphites, but is quite important in the production of the low boiling products, as the latter are more sensitive to the action of hydrogen halides. Therefore, in order to obtain optimum yields of the low boiling dialkyl phosphites, it is essential to strongly cool these products promptly after their formation in order to avoid their decomposition by reaction with hydrogen halides.

The cooling of the reaction products may be achieved simply by removing them promptly from the reaction zone to a zone of lower temperature, and allowing them to cool or they may be cooled more positively by means of a Dry Ice bath or any other suitable cooling means.

The reactants are desirably brought together in the reaction zone in the form of relatively small streams in order to insure intimate and uniform mixing, to facilitate the dissipation of the reaction heat and to aid in the separation of the volatile impurities from the crude liquid reaction product. The reactants are preferably brought together in continuous streams by means of a flow mixer such as disclosed in the accompanying drawings, jet mixers, injectors and turbulence mixers of the type disclosed on pages 1542 and 1543 of Perry's Chemical Engineers Handbook (Textbook Edition) 1941. However, any flow mixer, mixing nozzle, mixing spray, etc. which is adapted for bringing continuous streams of reactants in contact with each other in the proper proportions for the reaction may be used. In addition to obtaining mixing and reaction at substantially a single point as indicated in the drawing, it is also within the scope of the invention to employ a line reactor wherein continuously flowing streams of reactants are brought together and allowed to react together as they flow through a common conduit which may or may not be provided with free space to facilitate separation of the volatile impurities. In the event no free space is provided, the reactants are promptly conveyed to a disengaging space which permits volatilization of the low boiling impurities and also cooling of the low boiling reaction products to a temperature where substantial reaction with hydrogen halide is avoided. Moreover, it is within the scope of the instant invention to use a falling-film reactor in which the phosphorus trihalide or alcohol or a mixture thereof with water flows down a column continuously and the other reactant (alcohol or a mixture thereof with water or phosphorus trihalide) is atomized or otherwise sprayed against this film to effect simultaneous mixing and reacting of these compounds; and also to employ an impingement type reactor in which the reactants are mixed continuously and allowed to impinge on one or more rotating discs which project the reaction products against the walls of a collection chamber at a relatively high velocity so as to break up the particles of liquid reaction product and thereby facilitate their separation from the gaseous reaction product. The walls of the column and collection chamber used in these procedures may be cooled in any suitable manner to absorb heat from the reaction products after their formation.

As hereinbefore indicated, the reaction products are promptly discharged into a collection zone where they are permitted to separate into a crude liquid product and a volatile gaseous product which is continuously exhausted from the system. This separation is facilitated by providing free space above the level of the crude liquid product which accumulates in the collection zone, by the use of reduced pressure in the collection zone, and by the higher temperature of the reaction product which results from using reaction temperature which are higher than those of previously employed methods.

The crude liquid product is continuously withdrawn into the top of a stripping column which is operated under reduced pressure. In the stripping column, the residual hydrogen halide, organic halide and unreacted materials are continuously removed from the crude liquid product to yield a product consisting essentially of the desired dialkyl or dicycloalkyl phosphite.

The relatively pure liquid product which usually contains less than 0.1% of hydrogen halide is continuously conducted from the stripper into a suitable receiver and used as such, but if further purity is desired, it is subjected to batch or continuous distillation to remove the last traces of impurities.

Although the foregoing description has been limited to the use of a stripping operation to separate hydrogen halides and low boiling impurities from the crude liqiud reaction product, the invention is not limited thereto as other methods may be employed. For example, it is possible in some cases to recover the crude liquid product in a form sufficiently pure by successively washing the product with dilute caustic soda and water. If desired, further purification may be achieved by adding a liquid hydrocarbon such as hexane to the wet product, followed by azeotropic distillation of the hydrocarbon and water.

The novel method of the instant invention is applicable to production of dialkyl and dicycloalkyl phosphites generally; more specifically, it is applicable to the production of these esters from liquid alcohols, and particularly liquid acyclic monohydric alcohols containing from 1 to 13 carbon atoms.

The advantages of this novel method over the methods of the prior art may be summarized as follows:

The method covered by the present invention is executed at higher temperatures than those employed by the methods of the prior art; it is carried out continuously without resorting to the use of a solvent; and in most instances, it results in an increased yield of dialkyl or dicycloalkyl phosphite over the batch method of making these products. Moreover, in view of the greater simplicity of this method as compared to those of the prior art, there is a substantial reduction in the floor space required for the apparatus; in the amount and cost of the initial installation; in the cost of maintenance of the apparatus; and also in the operating costs.

While the invention has been described with particular reference to specific embodiments, it is to be understood that it is not to be limited thereto but is to be construed broadly and restricted solely by the scope of the appended claims.

What I claim is:

1. The method of continuously producing di-hydrocarbon phosphites of high purity and in improved yields, which comprises continuously bringing together and reacting separate flowing streams of (a) a phosphorus trihalide and (b) a member selected from the group consisting of a monohydric hydrocarbon alcohol and a mixture of water and a monohydric hydrocarbon alcohol in proportions required to yield a di-hydrocarbon phosphite and simultaneously permitting the temperature of the chemical reaction to seek its own level thereby effecting substantially complete reaction between the said reactants the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below that of the temperature at which the di-hydrocarbon phosphite product decomposes due to the dissolved hydrogen halide contained therein, and continuously removing the crude liquid from said cooling zone, the said reaction between the phosphorus trihalide and the monohydric hydrocarbon alcohol being conducted in the absence of a solvent, the said monohydric alcohol reactant being selected from the group consisting of a saturated primary acyclic hydrocarbon alcohol, a saturated secondary acyclic hydrocarbon alcohol, and a saturated alicyclic hydrocarbon alcohol wherein the hydroxy substitutent is attached to a secondary ring carbon atom, the said proportions required to yield the said di-hydrocarbon phosphite being $x$ moles of monohydric hydrocarbon alcohol and $y$ moles of water per mole of phosphorus trihalide wherein $y$ is not greater than 1 and wherein the sum total of $x$ and $y$ is substantially 3.

2. The method of continuously producing dialkyl phosphites of high purity and in improved yields, which comprises continuously bringing together and reacting separate flowing streams of phosphorus trichloride and a saturated primary acyclic hydrocarbon monohydric alcohol and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dialkyl phosphite product decomposes due to the dissolved hydrogen chloride contained therein, continuously removing the crude liquid from said cooling zone, and subjecting said crude liquid to a purification operation wherein the residual impurities are substantially removed, the said reaction between the phosphorus trichloride and the alcohol being conducted in the absence of a solvent, the said reactants being employed in proportions to substantially 3 moles of alcohol to 1 mole of phosphorus trichloride.

3. The method of continuously producing dialkyl phosphites of high purity and in improved yields, which comprises continuously bringing together and reacting separate flowing streams of phosphorus trichloride and a saturated primary acyclic hydrocarbon monohydric alcohol and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dialkyl phosphite product decomposes due to the dissolved hydrogen chloride contained therein, and continuously removing the crude liquid from said cooling zone to a stripping column operating under pressure wherein the residual impurities are substantially removed, the said reaction between the phosphorus trichloride and the alcohol being conducted in the absence of a solvent, the said reactants being employed in proportions of substantially 3 moles of alcohol to 1 mole of phosphorus trichloride.

4. The method of continuously producing dialkyl phosphites of high purity and in improved yields, which comprises continuously bringing together and reacting separate flowing streams of phosphorus trichloride and a saturated secondary acyclic hydrocarbon monohydric alcohol and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dialkyl phosphite product decomposes due to the dissolved hydrogen halide contained therein, continuously removing the crude liquid from said cooling zone, and subjecting said crude liquid to a purification operation wherein the residual impurities are substantially removed, the said reaction between the phosphorus trichloride and the alcohol being conducted in the absence of a solvent, the said reactants being employed in proportions of substantially 3 moles of alcohol to 1 mole of phosphorus trichloride.

5. The method of continuously producing dialkyl phosphites of high purity and in improved yields, which comprises continuously bringing together and reacting separate flowing streams of phosphorus trichloride and a saturated secondary acyclic hydrocarbon monohydric alcohol and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dialkyl phosphite product decomposes due to the dissolved hydrogen chloride contained therein, and continuously removing the crude liquid from said cooling zone to a stripping column operating under pressure wherein the residual impurities are substantially removed, the said reaction between the phosphorus trichloride and the alcohol being conducted in the absence of a solvent, the said reactants being employed in portions of substantially 3 moles of alcohol to 1 mole of phosphorus trichloride.

6. The method of continuously producing dimethyl phosphite of high purity and in improved yields, which comprises continuously bringing together and reacting separate flowing streams of methyl alcohol and phosphorus trichloride in a molar proportion of substantially 3:1 and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dimethyl phosphite product decomposes due to the dissolved hydrogen chloride contained therein, and continuously removing the crude dimethyl phosphite from the said cooling zone to a stripping column operating under pressure wherein the residual impurities are substantially removed, the said reaction between the phosphorus trichloride and the methyl alcohol being conducted in the absence of a solvent.

7. The method of continuously producing diethyl phosphite of high purity and in improved yields, which comprises continuously bringing together and reacting separate flowing streams of ethyl alcohol and phosphorus trichloride in a molar proportion of substantially 3:1 and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the diethyl phosphite product decomposes due to the dissolved hydrogen halide contained therein, and continuously removing the crude diethyl phosphite from said cooling zone to a stripping column operating under pressure wherein the residual impurities are substantially removed, the said reaction between the phosphorus trichloride and the ethyl alcohol being conducted in the absence of a solvent.

8. The method of continuously producing diisopropyl phosphite of high purity and in improved yields, which comprises continuously bringing together and reacting separate flowing streams of isopropyl alcohol and phosphorus trichloride in a molar proportion of substantially 3:1 and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the diisopropyl phosphite product decomposes due to the dissolved hydrogen chloride contained therein, and continuously removing the crude diisopropyl phosphite from said cooling zone to a stripping column operating under pressure wherein the residual impurities are substantially removed, the said reaction between the phosphorus trichloride and the isopropyl alcohol being conducted in the absence of a solvent.

9. The method of continuously producing di-n-butyl phosphite of high purity and in improved yields, which comprises continuously bringing together and reacting separate flowing streams of n-butyl alcohol and phosphorus trichloride in a molar proportion of substantially 3:1 and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the di-n-butyl phosphite product decomposes due to the dissolved hydrogen chloride contained therein, and continuously removing the crude di-n-butyl phosphite from said cooling zone to a stripping column operating under pressure wherein the residual impurities are substantially removed, the said reaction between the phosphorus trichloride and the n-butyl alcohol being conducted in the absence of a solvent.

10. The method of continuously producing dicyclohexyl phosphite of high purity and in improved yields, which comprises continuously bringing together and reacting separate flowing streams of cyclohexyl alcohol and phosphorus trichloride in a molar proportion of substantially 3:1 and simultaneously permitting the temperature of the chemical reaction to seek its own level thereby effecting substantially complete reaction between the said reactants, the said temperature being in the range of about 30° C. to about 100° C., continuously removing the reaction products to a cooling zone wherein a substantial proportion of the volatile by-products are continuously separated, the temperature to which the reaction mass is cooled in the said cooling zone being below the temperature at which the dicyclohexyl phosphite product decomposes due to the dissolved hydrogen halide contained therein, and continuously removing the crude dicyclohexyl phosphite from said cooling zone to a stripping column operating under pressure wherein the residual impurities are substantially removed, the said reaction between the phosphorus trichloride and the cyclohexyl alcohol being conducted in the absence of a solvent.

References Cited in the file of this patent

UNITED STATES PATENTS

| 1,993,723 | Kyrides | Mar. 5, 1935 |
| 2,078,421 | Shuman | Apr. 27, 1937 |
| 2,121,611 | Salzberg | June 21, 1938 |
| 2,226,552 | Conary et al. | Dec. 31, 1940 |
| 2,631,161 | Haufe et al. | Mar. 10, 1953 |

FOREIGN PATENTS

| 628,273 | Germany | Mar. 31, 1936 |
| 601,210 | Great Britain | Apr. 30, 1948 |

OTHER REFERENCES

Kosolapoff: Organophosphorus Compound, John Wiley & Son, N. Y. (1950), pp. 182, 183.